(12) United States Patent
Knuble et al.

(10) Patent No.: US 10,659,094 B1
(45) Date of Patent: May 19, 2020

(54) ULTRA-BROADBAND MICROWAVE RADIOMETER OPTIMIZED FOR MICROSATELLITE APPLICATIONS

(71) Applicant: UNITED STATES OF AMERICA AS REPRESENTED BY THE ADMINISTRATOR OF NASA, Washington, DC (US)

(72) Inventors: Joseph Knuble, Washington, DC (US); Jeffrey Piepmeier, Greenbelt, MD (US); Kevin Horgan, Washington, DC (US); Jared Lucey, Columbia, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/371,254

(22) Filed: Apr. 1, 2019

(51) Int. Cl.
*H04B 1/16* (2006.01)
*H04B 7/185* (2006.01)
*H04B 1/00* (2006.01)
*H04B 1/18* (2006.01)

(52) U.S. Cl.
CPC ......... *H04B 1/1615* (2013.01); *H04B 1/0028* (2013.01); *H04B 1/1638* (2013.01); *H04B 1/18* (2013.01); *H04B 7/18515* (2013.01)

(58) Field of Classification Search
CPC .. H04B 1/1615; H04B 1/0028; H04B 1/1638; H04B 1/18; H04B 7/18515
See application file for complete search history.

(56) References Cited

U.S. PATENT DOCUMENTS

| | | | |
|---|---|---|---|
| 6,738,611 B1 * | 5/2004 | Politi | H03D 9/0633 333/116 |
| 8,884,664 B1 * | 11/2014 | Bradley | H03B 19/00 327/115 |
| 2009/0160430 A1 * | 6/2009 | Brown | G01R 23/16 324/76.23 |
| 2018/0266969 A1 * | 9/2018 | Jean | F02C 7/30 |

* cited by examiner

*Primary Examiner* — Nguyen T Vo
(74) *Attorney, Agent, or Firm* — Matthew F. Johnston; Bryan A. Geurts

(57) ABSTRACT

A microwave radiometer with reduced volume, mass, phase noise, and power requirements and increased harmonic rejection, includes a fixed number of frequency banks configured to provide signals within separate, non-overlapping local oscillation frequency bands, a detection circuit configured to detect one or more microwave RF signals, and an RF downconverter configured to mix the signals within the separate, non-overlapping local oscillation frequency bands with the one or more microwave RF signals to provide a continuous range of down converted frequencies.

16 Claims, 3 Drawing Sheets

ULTRA-BROADBAND MICROWAVE RADIOMETER OPTIMIZED FOR MICROSATELLITE APPLICATIONS

ORIGIN OF THE INVENTION

Invention by Government Employee(s) Only

The invention described herein was made by an employee of the United States Government, and may be manufactured and used by or for the Government for governmental purposes without the payment of any royalties thereon or therefor.

BACKGROUND

Field

The aspects of the present disclosure relate generally to a microwave radiometer, in particular to a microwave radiometer suitable for use in CubeSat applications.

Description of Related Art

A CubeSat is a small satellite having dimensions based on a standard CubeSat unit (U) of a 10 cm cube, with a mass equal to or less than approximately 1.33 kg, and specific energy consumption and generation constraints. Typical sizes include 1.5 U, 2 U, 3 U, and 6 U, with additional sizes being developed. The small sizes, and standardization of sizes, masses, and energy constraints has made it cost effective to provide mass produced, off the shelf components and have also resulted in reduced development costs. The small sizes and standardizations have also reduced costs associated with transport and space deployment.

CubeSat applications typically involve experiments which may verify underlying theories, demonstrate spacecraft technologies, provide planetary observations, demonstrate radio applications, or implement any other space related applications.

Microwave radiometers are relatively sensitive microwave receivers that are typically used to detect microwave emissions of atmospheric gasses. Microwave emissions vary in wavelength based on pressure, temperature, of atmospheric layers, and a microwave radiometer is designed to measure thermal electromagnetic radiation emitted by atmospheric gases. While there have been microwave radiometers designed to CubeStat specifications, previously available CubeSat microwave radiometers are not known to have a wide band tuning range and acceptable harmonic rejection and phase noise. Typical CubeSat microwave radiometers are usually limited to discrete frequencies for measuring specific atmospheric characteristics.

SUMMARY

As described herein, the exemplary embodiments overcome one or more of the above or other disadvantages known in the art.

One aspect of the disclosed embodiments may relate to a microwave radiometer with reduced volume, mass, phase noise, and power requirements and increased harmonic rejection, including a fixed number of frequency banks configured to provide signals within separate, non-overlapping local oscillation frequency bands, a detection circuit configured to detect one or more microwave RF signals, and an RF downconverter configured to mix the signals within the separate, non-overlapping local oscillation frequency bands with the one or more microwave RF signals to provide a continuous range of down converted frequencies.

The microwave radiometer may include a comb generator configured to generate harmonics of a fundamental frequency as inputs to the fixed number of frequency banks.

The fixed number of frequency banks may be individually configured to generate a separate, non-overlapping local oscillation frequency from at least one of the harmonics of the comb generator.

The microwave radiometer may include a switched power circuit for selectively powering amplifiers of individual ones of the frequency banks.

The detection circuit may include a switch for selecting among a plurality of antenna configured to receive different frequency bands to detect the microwave RF signal.

The RF downconverter may include a sub-harmonic mixer configured to double the signals within the separate, non-overlapping local oscillation frequency bands and mix the doubled signals with different phases of the one or more microwave RF signals to generate double sideband signals.

The microwave radiometer may include a switch for selecting among the frequency banks to couple one of the signals within the separate, non-overlapping local oscillation frequency bands to the RF downconverter.

The microwave radiometer may also include a coupler for generating an upper and lower sideband down converted signal from the double sideband signals.

The microwave radiometer may further include a switch for coupling one of the upper or lower sideband down converted signals to an A/D converter, where the A/D converter may have a bandwidth wider than the upper sideband down converted signal and wider than the lower sideband down converted signal.

Another aspect of the disclosed embodiments may relate to a method of detecting microwave emissions utilizing a microwave radiometer with reduced volume, mass, phase noise, and power requirements and increased harmonic rejection, where the method includes configuring a fixed number of frequency banks to provide signals within separate, non-overlapping local oscillation frequency bands, detecting one or more microwave RF signals, and configuring an RF downconverter to mix the signals within the separate, non-overlapping local oscillation frequency bands with the one or more microwave RF signals to provide a continuous range of down converted frequencies.

The method may include configuring a comb generator to generate harmonics of a fundamental frequency as inputs to the fixed number of frequency banks.

The method may also include individually configuring the fixed number of frequency banks to generate a separate, non-overlapping local oscillation frequency from at least one of the harmonics of the comb generator.

The method may further include selectively powering amplifiers of individual ones of the frequency banks.

The method may still further include selecting among a plurality of antennas configured to receive different frequency bands to detect the microwave RF signal.

The method may yet further include using a sub-harmonic mixer to double the signals within the separate, non-overlapping local oscillation frequency bands and mix the doubled signals with different phases of the one or more microwave RF signals to generate double sideband signals.

The method may include selecting among the frequency banks to couple one of the signals within the separate, non-overlapping local oscillation frequency bands to the RF downconverter.

The method may also include generating an upper and lower sideband down converted signal from the double sideband signals.

The method may further include converting one of the upper or lower sideband down converted signals to a digital signal utilizing an A/D converter having a bandwidth wider than the upper sideband down converted signal and wider than the lower sideband down converted signal.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the disclosed embodiments, for which reference should be made to the appended claims. Additional aspects and advantages of the invention will be set forth in the description that follows, and in part will be obvious from the description, or may be learned by practice of the invention. Moreover, the aspects and advantages of the disclosed embodiments may be realized and obtained by means of the instrumentalities and combinations particularly pointed out in the appended claims.

DETAILED DESCRIPTION OF THE DISCLOSED EMBODIMENTS

The disclosed embodiments uniquely combine several technologies to achieve mass, volume, and power requirement reductions while providing continuous radio frequency (RF) frequency coverage, high local oscillator (LO) harmonic rejection, high LO RF power and low LO phase noise. The disclosed embodiments generally include a sub-harmonically pumped mixer, an upper-lower side-band-select switch, wide-band analog-to-digital converters for intermediate frequency (IF) sampling, a broad-band frequency synthesizer used as a comb generator, and selectively powered frequency selection banks for a local oscillator. While the disclosed embodiments are described as operating from 6-40 GHz with an IF of 1-2 GHz, it should be understood that these ranges are exemplary, and that the disclosed embodiments may operate at any frequencies suitable for microwave radiometry within limitations of the component parts. Furthermore, it should be understood that the disclosed embodiments are not limited to CubeSat applications, but may be utilized in any terrestrial and non-terrestrial applications.

Figure 1:
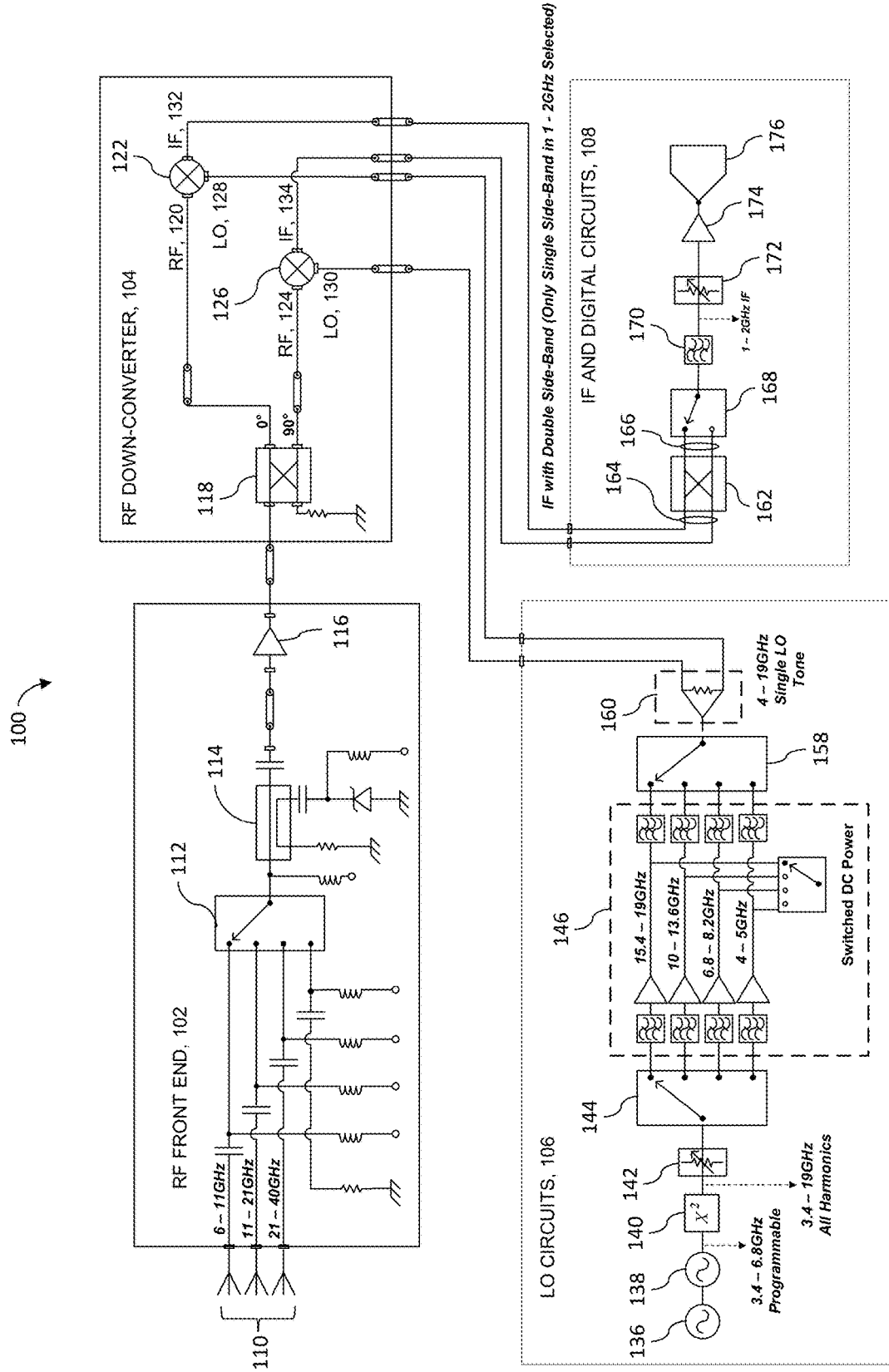
FIG. 1 shows a schematic block diagram of an exemplary ultra-broadband microwave radiometer 100 according to the disclosed embodiments.

FIG. 1 shows a schematic block diagram of an exemplary ultra-broadband microwave radiometer 100 according to the disclosed embodiments. The exemplary ultra-broadband microwave radiometer 100 may include a radio frequency (RF) front end detection circuit 102, an RF down converter 104, local oscillator (LO) circuits 106, and IF and digital circuits 108. Specific circuitry is described as implementing these functions, however it should be understood that the disclosed circuitry is exemplary and that the functions may be implemented using any suitable components and using hardware, software or any suitable combination of hardware and software.

The detection circuit 102 may include a number of antennas 110 dedicated to receiving individual frequency bands. As an example, one or more antennas may be configured to receive a range of frequencies including from 6-11 GHz, one or more antennas may be configured to receive a range of frequencies including from 11-21 GHz, and one or more antennas may be configured to receive a range of frequencies including from 21-40 GHz. It should be understood that the antennas may be capable of receiving any suitable range of microwave frequencies. The outputs of the antennas 110 may be selectively coupled to the RF down converter 104 through a switch 112, a directional coupler 114, and a low noise amplifier 116.

The RF down converter 104 may include a first 90° hybrid coupler 118, with a 0° output coupled to a first or RF input 120 of a first subharmonic mixer 122, and a 90° output coupled to a first or RF input 124 of a second harmonic mixer 126. Second or LO inputs 128, 130 of the first and second harmonic mixers 122, 126, respectively, may be coupled to outputs of the local oscillator circuits 106, and the outputs 132, 134 of the first and second harmonic mixers 122, 126 may be coupled to the IF and digital circuits 108.

The local oscillator circuits 106 may include a temperature compensated crystal oscillator 136 which may have an output coupled to a programmable phased locked oscillator 138, which in turn may have an output coupled to a frequency multiplier 140. In some embodiments, the programmable phased locked oscillator 138 and frequency multiplier 140 may be configured as a single component, however, for purposes of the present disclosure, their functions will be described separately. The frequency multiplier 140 may effectively operate as a comb generator and may be configured to output the fundamental frequency (Ff) of the programmable phased locked oscillator 138 as well as a wide range of harmonics of the fundamental input frequency 2*Ff, 3*Ff, 4*Ff, . . . n*Ff. For example, for a programmed 4 GHz output of the phase locked oscillator 138, the output of the frequency multiplier 140 may include frequencies of 4 GHZ, 8 GHz, 12 GHz, and 16 GHz.

The output of the frequency multiplier 140 may be coupled to a digital step attenuator 142 which may have an output coupled to a switch 144. The switch 144 may have a number of output terminals connected to individual ones of a set 146 of one or more frequency banks $148_1 \ldots 148_n$.

Figure 2:
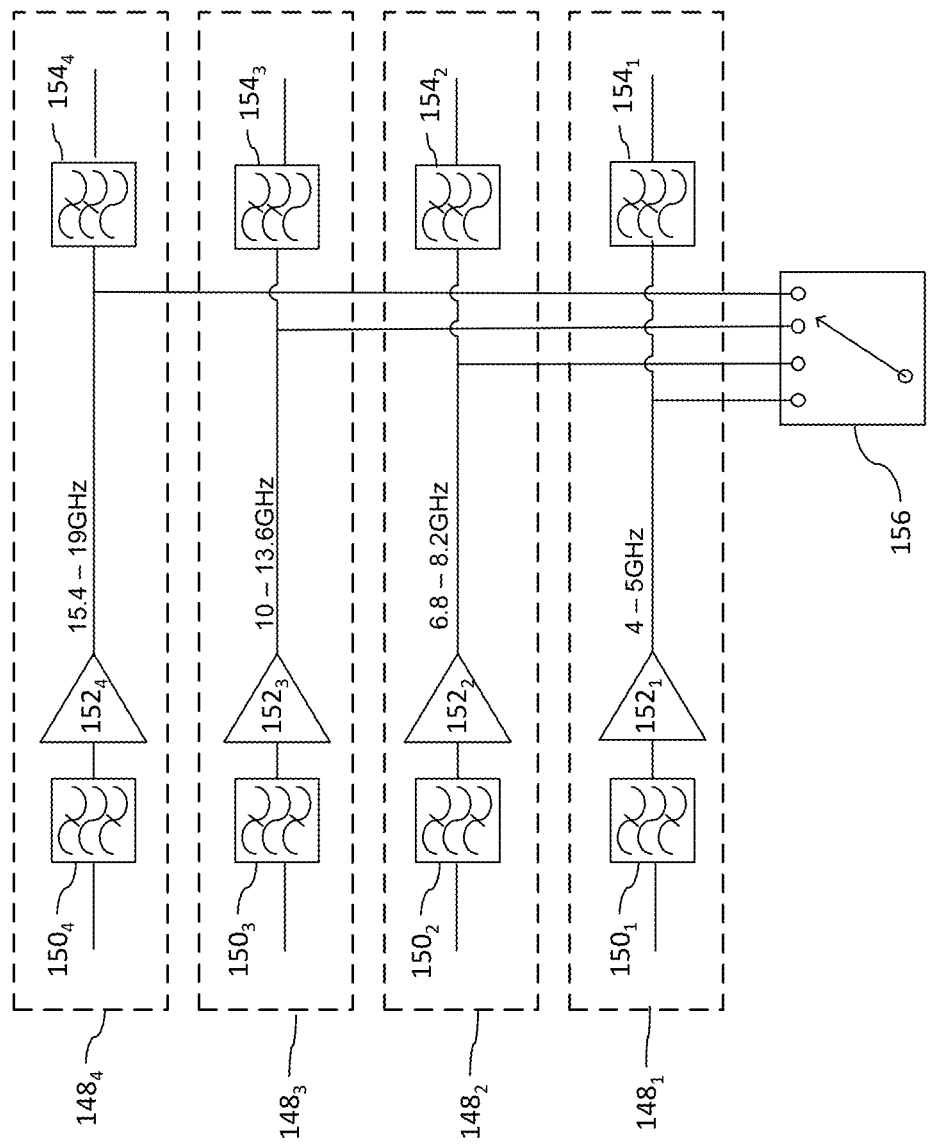
FIG. 2 shows an expanded schematic block diagram of one or more frequency banks according to the disclosed embodiments.

FIG. 2 shows an expanded schematic block diagram of the one or more frequency banks 1481 . . . 148n when n=4. Each frequency bank 148 may include one or more band pass filters 150, one or more amplifiers 152, and one or more high pass filters 154, optimized for a particular frequency range, for example, one of the harmonics output by the frequency multiplier 140, while suppressing all other harmonics. For example, frequency bank 1481 may have band pass filters 1501, amplifiers 1521, and high pass filters 1541 optimized to output a frequency range of approximately 4-5 GHz, frequency bank 1482 may have band pass filters 1502, amplifiers 1522, and high pass filters 1542 optimized to output a frequency range of approximately 6.8-8.2 GHz, frequency bank 1483 may have band pass filters 1503, amplifiers 1523, and high pass filters 1543, optimized to output a frequency range of approximately 10.0-13.6 GHz, and frequency bank 1484 may have band pass filters 1504, amplifiers 1524, and high pass filters 1544 optimized to output a frequency range of approximately 15.4-19.0 GHz.

The set of frequency banks may also include a switched DC power circuit 156 for selectively providing power to the amplifiers 1521 . . . 1524. Separately powering only the amplifiers within the frequency bank being used may improve harmonic rejection in that unwanted comb products resulting from RF or switch leakage may not be otherwise amplified by the other frequency banks. Selective bank powering may also allow the frequency banks to be packaged compactly, in close proximity, and with a reduced volume, because of the lack of RF leakage. Optimizing each of the frequency banks for a particular harmonic of the frequency multiplier 140 and selectively powering the frequency banks may further operate to significantly lower phase noise. While the disclosed embodiments are described in terms of four frequency banks, it should be understood that any number of frequency banks may be utilized to achieve a particular range of frequencies.

Returning to FIG. 1, the outputs of the frequency banks 1481 . . . 148n may be coupled to corresponding input terminals of switch 158. The output of switch 158 may be coupled to a power divider 160, and the outputs of the power divider 160 may be coupled to the second (LO) inputs 128, 130 of the subharmonic mixers 122, 126. The outputs 132, 134 of the subharmonic mixers 122, 126 may in turn be coupled to the IF and digital circuits 108.

The IF and digital circuits 108 may include a second 90° hybrid coupler 162 with inputs 164 coupled to the outputs 132, 134 of the subharmonic mixers 122, 126, and outputs 166 coupled to input terminals of a sideband selection switch 168. The output of the sideband selection switch 168 may be connected to an analog to digital converter 176 through an IF bandpass filter 170, a digital step attenuator 172 and one or more amplifiers 174.

Figure 3:
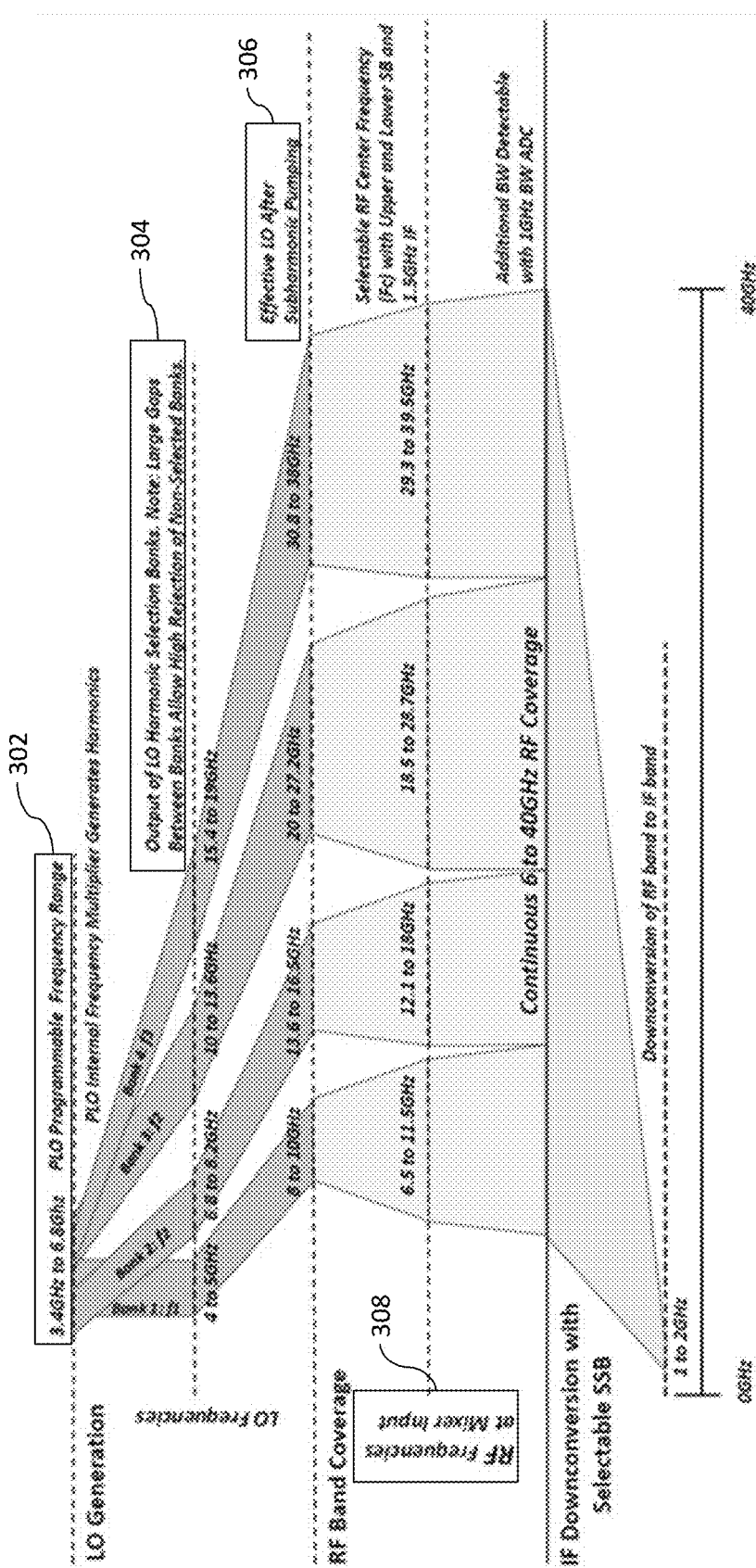
FIG. 3 illustrate an exemplary frequency map of the ultra-broadband microwave radiometer according to the disclosed embodiments.

FIG. 3 illustrate an exemplary frequency map of the ultra-broadband microwave radiometer 100. Exemplary operations of the ultra-broadband microwave radiometer 100 are described with respect to FIGS. 1, 2, and 3.

Referring to the local oscillator circuits 106, the programmable local oscillator 138 may be programed to generate a single frequency output in an exemplary range of 3.4-6.8 GHz (302, FIG. 3). As a result, the frequency multiplier 140 operating as a comb generator as described above, and may generate a range of frequencies including the fundamental frequency (Ff) from the programmable local oscillator 138 as well as a wide range of harmonics of the fundamental input frequency 2*Ff, 3*Ff, 4*Ff, . . . n*Ff. The digital step attenuator 142 maybe used to attenuate the fundamental frequency and harmonics to a level usable by a selected frequency bank 1481 . . . 1484. An output terminal of the switch 144 may be selected to provide the output of the digital step attenuator 142 to one of the frequency banks 1481 . . . 1484. One of the frequency banks may be selected to provide a single LO tone of the harmonics produced by the frequency multiplier 140 to the LO inputs 128, 130 of the subharmonic mixers 122, 126, respectively. Upon selection of the particular frequency bank, the switched DC power circuit 156 is enabled to provide power to the amplifier of the selected frequency bank.

In the illustrated example, frequency bank 1481 may be optimized to output a frequency range of approximately 4-5 GHz, frequency bank 1482 may be optimized to output a frequency range of approximately 6.8-8.2 GHz, frequency bank 1483 may be optimized to output a frequency range of approximately 10.0-13.6 GHz, and frequency bank 1484 may be optimized to output a frequency range of approximately 15.4-19.0 GHz (304, FIG. 3). The input terminal of switch 158 corresponding to the selected frequency bank 1481 . . . 1484 may be connected to the LO inputs 128, 130 of the subharmonic mixers 122, 126 through the power divider 160. Referring to FIG. 3, 306, the effective LO frequency ranges after subharmonic pumping may range from approximately 8.0-10.0 GHz for the output of frequency bank 1481, from 13.6-16.5 GHz for the output of frequency bank 1482, from 20.0-27.2 GHz for the output of frequency bank 1483, and from 30.0-38.0 GHz for the output of frequency bank 1484.

Referring to the detection circuit 102, the output of an antenna 110 receiving the frequency of interest may be selected by switch 112 and provided to the first 90° hybrid coupler 118 through directional coupler 114 and low noise amplifier 116. Referring to FIG. 3, 308, frequency bands of approximately 6.5-11.0 GHz, 12.1-18.0 GHz, 18.5-28.7 GHz, and 29.3-39.5 GHz may be provided depending on the antenna selected by switch 112. As a result, the 8.0-10.0 GHz LO frequency band may be mixed with the 6.5-11.0 GHz RF frequency band, the 13.6-16.5 GHz LO frequency band may be mixed with the 12.-18.0 RF frequency band, the 20.0-27.2 GHz LO frequency band may be mixed with the 18.5-28.7 RF frequency band, and the 30.0-38.0 GHz LO frequency band may be mixed with the 29.3-39.5 RF frequency band. As a result, the outputs 132, 134 of the subharmonic mixers 122, 124 may be down converted double sideband outputs with a 90° phase difference.

The outputs 132, 134 of the subharmonic mixers 122, 124 may be coupled to the inputs 164 of the second 90° hybrid coupler 162, and as a result, the down converted upper sideband may be output on one output terminal and the down converted lower sideband may be output on the other output terminal. The side band select switch 168 may be used to select between the outputs 166 of the second 90° hybrid coupler 162, to provide the down converted frequencies to the ADC 176 through the band pass filter 170, the digital step attenuator 172 and the amplifiers 174.

Thus, the disclosed embodiments uniquely combine several technologies to provide full coverage over a range of frequencies without using local oscillators to generating the full range of frequencies. The disclosed embodiments utilize a broad band frequency generator as a comb generator, feeding a fixed number of selectively powered frequency banks having separate, non-overlapping frequency ranges to provide local oscillation frequencies, in combination with a sub-harmonically pumped mixer configuration that mixes the local oscillation frequencies with upper and lower RF sidebands, to provide continuous microwave receiver coverage over a range of frequencies, for example, from 6-40 GHz with an IF of 1-2 GHz.

Continuous coverage with a limited number of non-overlapping frequency banks is further enabled because the desired RF center frequency (Fc) does not need to be mixed to the exemplary IF center frequency (Fifc) of 1.5 GHz, but only to +/−300 MHz of the Fifc. This allowed range (Fr) of 300 MHz from the IF center frequency implies that the actual RF bandwidth of the disclosed ultra-bandwidth microwave radiometer is limited to 400 MHz for the particular RF frequencies which are down-converted to the maximum deviation of Fifc+/−Fr. The use of modern broad-band ADCs 176 with sampling capabilities of up to 2.7 GHz permit this wide frequency range and allows different digital filters to be used for the different RF bands. An important note is that this flexibility allows up to 600 MHz of separation between RF center frequencies (2*Fr) and, as a result, the LO circuits 106 do not need to generate every LO frequency in order to down-convert every RF frequency to the desired IF range. This allows the number of frequency banks 148 to be limited as frequency overlap between the frequency banks is not required for continuous RF coverage. The gaps in frequency coverage of the LO circuits further operate to increase LO harmonic rejection.

The side band select switch 168 permits a given RF center frequency (Frfc) to be selected from either the upper sideband LO frequency or lower side-band LO frequency. In the case of the exemplary Fifc of 1.5 GHz, the required LO frequencies may be +/−1.5 GHz from the Frfc. When this technique is combined with the Fr—flexibility discussed above the required LO frequencies may be separated from the desired Frfc by Fifc+Fr or 1.8 GHz. Limiting the number of frequencies the LO system is required to generate not only reduces the number of frequency banks, but also allows for limiting the frequency banks bandwidths in order to more effectively suppress harmonics outside the frequency banks pass-bands. The use of the sub-harmonically pumped RF mixer further reduces the required LO coverage range by a factor of two. When combined with the flexibility techniques above, an exemplary frequency range for the LO may be reduced to from 4-19 GHz.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. A microwave radiometer with reduced volume, mass, phase noise, and power requirements and increased harmonic rejection, comprising:
    a fixed number of frequency banks configured to provide signals within separate, non-overlapping local oscillation frequency bands;
    a detection circuit configured to receive and detect one or more microwave RF signals;
    an RF downconverter connected to said detection circuit and said frequency banks, said RF downconverter configured to mix the signals within the separate, non-overlapping local oscillation frequency bands with the one or more of said microwave RF signals to provide a continuous range of down converted frequencies; and
    a switched power circuit for selectively powering amplifiers of individual ones of the frequency banks.

2. The microwave radiometer of claim 1, further comprising a comb generator configured to generate harmonics of a fundamental frequency as inputs to the fixed number of frequency banks.

3. The microwave radiometer of claim 2, wherein the fixed number of frequency banks are individually configured to generate a separate, non-overlapping local oscillation frequency from at least one of the harmonics of the comb generator.

4. The microwave radiometer of claim 1, wherein the detection circuit comprises a switch for selecting among a plurality of antenna configured to receive different frequency bands to detect the microwave RF signal.

5. The microwave radiometer of claim 1, wherein the RF downconverter comprises a sub-harmonic mixer configured to double the signals within the separate, non-overlapping local oscillation frequency bands and mix the doubled signals with different phases of the one or more microwave RF signals to generate double sideband signals.

6. The microwave radiometer of claim 5, further comprising a switch for selecting among the frequency banks to couple one of the signals within the separate, non-overlapping local oscillation frequency bands to the RF downconverter.

7. The microwave radiometer of claim 6, further comprising a coupler for generating an upper and lower sideband down converted signal from the double sideband signals.

8. The microwave radiometer of claim 7, further comprising a switch for coupling one of the upper or lower sideband down converted signals to an A/D converter, the A/D converter comprising a bandwidth wider than the upper sideband down converted signal and wider than the lower sideband down converted signal.

9. A method of detecting microwave emissions utilizing a microwave radiometer with reduced volume, mass, phase noise, and power requirements and increased harmonic rejection, the method comprising:
    configuring a fixed number of frequency banks to provide signals within separate, non-overlapping, local oscillation frequency bands;
    receiving and detecting one or more microwave RF signals;
    configuring an RF downconverter to mix the signals within the separate, non-overlapping local oscillation frequency bands with the one or more microwave RF signals to provide a continuous range of down converted frequencies; and
    selectively powering amplifiers of individual ones of the frequency banks.

10. The method of detecting microwave emissions of claim 9, comprising configuring a comb generator to generate harmonics of a fundamental frequency as inputs to the fixed number of frequency banks.

11. The method of detecting microwave emissions of claim 10, comprising individually configuring the fixed number of frequency banks to generate a separate, non-overlapping local oscillation frequency from at least one of the harmonics of the comb generator.

12. The method of detecting microwave emissions of claim 9, comprising selecting among a plurality of antennas configured to receive different frequency bands to detect the microwave RF signal.

13. The method of detecting microwave emissions of claim 9, comprising using a sub-harmonic mixer to double the signals within the separate, non-overlapping local oscillation frequency bands and mix the doubled signals with different phases of the one or more microwave RF signals to generate double sideband signals.

14. The method of detecting microwave emissions of claim 13, comprising selecting among the frequency banks to couple one of the signals within the separate, non-overlapping local oscillation frequency bands to the RF downconverter.

15. The method of detecting microwave emissions of claim 14, further comprising generating an upper and lower sideband down converted signal from the double sideband signals.

16. The method of detecting microwave emissions of claim 15, further comprising converting one of the upper or lower sideband down converted signals to a digital signal utilizing an A/D converter having a bandwidth wider than the upper sideband down converted signal and wider than the lower sideband down converted signal.

\* \* \* \* \*